(12) United States Patent
Fujita et al.

(10) Patent No.: US 10,691,213 B2
(45) Date of Patent: Jun. 23, 2020

(54) TOP PANEL FOR TACTILE SENSATION DISPLAY DEVICE, AND TACTILE SENSATION DISPLAY DEVICE

(71) Applicant: NIPPON ELECTRIC GLASS CO., LTD., Otsu-shi, Shiga (JP)

(72) Inventors: Naoki Fujita, Otsu (JP); Shinsaku Nishida, Otsu (JP); Atsuki Saito, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 16/474,346

(22) PCT Filed: Apr. 3, 2018

(86) PCT No.: PCT/JP2018/014258
§ 371 (c)(1),
(2) Date: Jun. 27, 2019

(87) PCT Pub. No.: WO2018/193834
PCT Pub. Date: Oct. 25, 2018

(65) Prior Publication Data
US 2019/0339778 A1    Nov. 7, 2019

(30) Foreign Application Priority Data

Apr. 18, 2017  (JP) ................... 2017-081766

(51) Int. Cl.
*G06F 3/01*    (2006.01)
*G06F 3/041*   (2006.01)

(52) U.S. Cl.
CPC ............ *G06F 3/016* (2013.01); *G06F 3/0412* (2013.01); *G06F 3/0414* (2013.01)

(58) Field of Classification Search
CPC ....... G06F 3/016; G06F 2203/013–015; G06F 3/03547; G06F 2203/014; G06F 2203/0338; G06F 3/0414; G06F 3/041; G06F 3/0362; G06F 3/0421; G06F 2203/04104; G06F 3/045; G06F 2203/04809; G06F 3/0416; G06F 3/0488; G06F 3/04883; G06F 2203/04808; G06F 3/01; G06F 2203/015
See application file for complete search history.

(56) References Cited

U.S. PATENT DOCUMENTS

2012/0194460 A1    8/2012  Kuwabara et al.
2018/0018022 A1    1/2018  Hoshi et al.

FOREIGN PATENT DOCUMENTS

| JP | 03-084834 A | 4/1991 |
|---|---|---|
| JP | 06-333360 A | 12/1994 |
| JP | 2010-097137 A | 4/2010 |
| JP | 2015-181068 A | 10/2015 |
| JP | 2016-102045 A | 6/2016 |
| WO | 2011/024434 A1 | 3/2011 |
| WO | 2016/157491 A1 | 10/2016 |

OTHER PUBLICATIONS

Official Communication issued in International Patent Application No. PCT/JP2018/014258, dated Jun. 12, 2018.

*Primary Examiner* — Sanjiv D. Patel
(74) *Attorney, Agent, or Firm* — Keating and Bennett, LLP

(57) ABSTRACT

Provided are a top panel for a tactile sensation display device and a tactile sensation display device that are capable of enhancing the expressiveness of tactile sensation. A top panel 1 for a tactile sensation display device is for use in a tactile sensation display device 10 and has an internal friction of $1.0 \times 10^{-2}$ or less.

5 Claims, 1 Drawing Sheet

[FIG. 1]
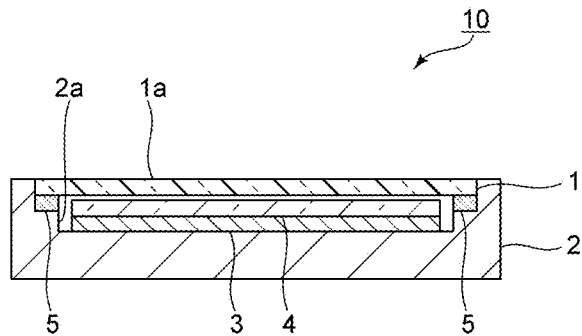
[FIG. 2]
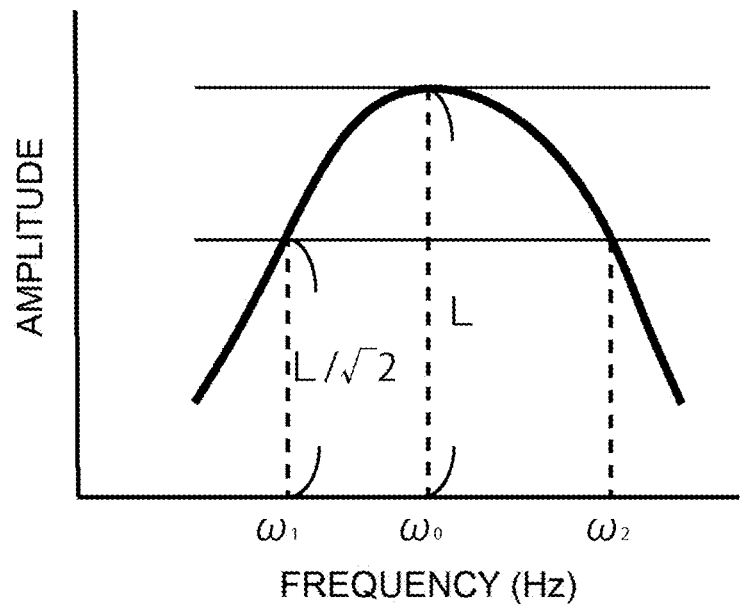
[FIG. 3]
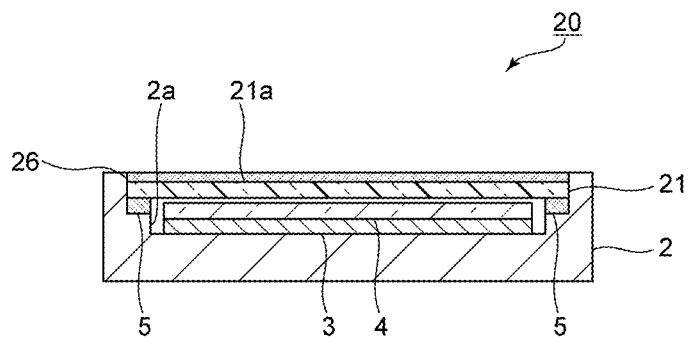

TOP PANEL FOR TACTILE SENSATION DISPLAY DEVICE, AND TACTILE SENSATION DISPLAY DEVICE

TECHNICAL FIELD

The present invention relates to top panels for tactile sensation display devices and tactile sensation display devices.

BACKGROUND ART

Recently, attention has been increasingly focused on tactile sensation display devices that provide information through a sense of touch. Specifically, there is known a tactile sensation display device that, in operation through a touch panel by a person, can change the person's tactile sensation at the time of touching the touch panel. Patent Literature 1 discloses, as an example, a tactile sensation display device that can change the frictional force at the time of a person's touch on the tactile sensation display device. This tactile sensation display device includes a top panel which is a part to be touched by a person. The tactile sensation is changed by applying ultrasonic waves to the top panel.

CITATION LIST

Patent Literature

[PTL 1]
JP-A-2015-181068

SUMMARY OF INVENTION

Technical Problem

The inventors found that, in such a tactile sensation display device as described in Patent Literature 1, the vibration from an actuator might be damped and not sufficiently transmitted to a person's finger, resulting in an insufficient range of expression of tactile sensation.

An object of the present invention is to provide a top panel for a tactile sensation display device and a tactile sensation display device that are capable of enhancing the expressiveness of tactile sensation.

Solution to Problem

A top panel for a tactile sensation display device according to the present invention is a top panel for use in a tactile sensation display device and has an internal friction of $1.0 \times 10^{-2}$ or less.

In the present invention, the internal friction is preferably $5.0 \times 10^{-3}$ or less.

The top panel for a tactile sensation display device according to the present invention may be made of glass.

The top panel for a tactile sensation display device according to the present invention may be transparent.

A tactile sensation display device according to the present invention includes: the above-described top panel for a tactile sensation display device according to the present invention; and an actuator that applies ultrasonic waves to the top panel for a tactile sensation display device.

Advantageous Effects of Invention

The present invention enables provision of a top panel for a tactile sensation display device and a tactile sensation display device that are capable of enhancing the expressiveness of tactile sensation.

BRIEF DESCRIPTION OF DRAWINGS

FIG. 1 is a schematic cross-sectional view showing a tactile sensation display device according to an embodiment of the present invention.

FIG. 2 is a graph for illustrating an example of a method for measuring internal friction.

FIG. 3 is a schematic cross-sectional view showing a modification of the tactile sensation display device according to the embodiment of the present invention.

DESCRIPTION OF EMBODIMENTS

Hereinafter, a description will be given of preferred embodiments. However, the following embodiments are merely illustrative and the present invention is not limited by the following embodiments. Throughout the drawings, elements having substantially the same functions may be referred to by the same reference signs.

FIG. 1 is a schematic cross-sectional view showing a tactile sensation display device according to an embodiment of the present invention. As shown in FIG. 1, the tactile sensation display device 10 according to this embodiment includes: a housing 2 with an opening 2a; a top panel 1 that seals the opening 2a; and actuators 5 provided to make contact with the top panel 1. The top panel 1 is a top panel for a tactile sensation display device according to an embodiment of the present invention. The actuators 5 are piezoelectric elements capable of applying ultrasonic waves to the top panel 1.

The tactile sensation display device 10 further includes: a display 3 provided in the housing 2; and a touch sensor 4 provided on top of the display 3. In this embodiment, the top panel 1 is made of transparent glass and the touch sensor 4 is a touch panel capable of transmitting light.

The top panel 1 has an outside principal surface 1a located on an outside (the user side) of the tactile sensation display device 10. The tactile sensation display device 10 is a device in which tactile sensation on the outside principal surface 1a changes. More specifically, the frictional force on the outside principal surface 1a changes. For example, when a person slides his/her finger on the outside principal surface 1a and the actuators 5 apply ultrasonic waves to a portion of the outside principal surface 1a where the slide is being made, the finger is pushed up by the vibrating outside principal surface 1a. Thus, the frictional force between the finger and the outside principal surface 1a decreases.

The tactile sensation display device 10 includes: a vibration control section (not shown) that controls the location on the top panel 1 where ultrasonic waves are to be applied by the actuators 5 and the amplitude of the ultrasonic waves; and an image control section (not shown) that controls the image to be displayed on the display 3. The vibration control section is connected to the actuators 5, the touch sensor 4, and the image control section. When the top panel 1 is touched with a person's finger, the touch sensor 4 detects the location of touch with the person's finger. Then, location data on the location of touch with the person's finger is input from the touch sensor 4 to the vibration control section. Location data on an image to be displayed on the display 3 or like data is also input from the image control section to the vibration control section. The vibration control section controls, according to the above location data and the image to be displayed on the display 3, the location on the top panel 1 where ultrasonic waves are to be applied by the actuators 5 and the amplitude of the ultrasonic waves.

The vibration control section can control the frictional force on each portion of the outside principal surface 1a of the top panel 1 by combining portions thereon where ultrasonic waves are applied with portions thereon where no ultrasonic wave is applied. When the portions where ultrasonic waves are applied and the portions where no ultrasonic wave is applied are alternately arranged, a sensation of undulation can be expressed. Alternatively, a sensation of undulation can also be expressed by alternately arranging portions where the amplitude of ultrasonic waves applied is large and portions where the amplitude of ultrasonic waves applied is small. In the above manners, the tactile sensation can be changed according to the location of touch with a person's finger and the image displayed on the display 3.

In the tactile sensation display device 10 according to this embodiment, the internal friction of the top panel 1 is $1.0 \times 10^{-2}$ or less.

The inventors have found that when the internal friction of the top panel 1 is not more than the above upper limit, the vibration from the actuators 5 are less likely to be damped in the top panel 1 and can securely be transmitted to the finger, so that the expressiveness of tactile sensation can be enhanced.

Furthermore, since in the present invention the vibration from the actuators 5 can securely be transmitted to the finger, the outputs of the actuators 5 can be reduced to save energy. In addition, the actuators 5 can be reduced in size.

From the viewpoint of making the vibration from the actuators 5 even less likely to be damped and more securely transmitting the vibration to the finger, the internal friction of the top panel 1 is preferably $5.0 \times 10^{-3}$ or less and more preferably $1.0 \times 10^{-3}$ or less. No particular limitation is placed on the lower limit of the internal friction of the top panel 1, but it may be, for example, $1.0 \times 10^{-4}$ in view of the nature of the material.

In the present invention, the Young's modulus of the top panel 1 is preferably 5 GPa or more, more preferably 10 GPa or more, and still more preferably 50 GPa or more. When the Young's modulus of the top panel 1 is the above lower limit or more, the vibration from the actuators 5 can be made even less likely to be damped and can be even more securely transmitted to the finger. In addition, the mechanical strength of the top panel 1 can be further increased, so that the top panel 1 can be even less likely to be damaged (deformed). No particular limitation is placed on the upper limit of the Young's modulus of the top panel 1, but it may be, for example, 470 GPa in view of the nature of the material.

In the present invention, the internal friction and Young's modulus of the top panel 1 can be measured in conformity with dynamic elastometry (the flexural resonance method) defined in JIS R 1602.

FIG. 2 is a graph for illustrating an example of a method for measuring the internal friction. The internal friction can be obtained using the following Formula (1) where $\omega_0$ represents a frequency at a resonance frequency peak shown in FIG. 2 and $\omega_1$ and $\omega_2$ represent frequencies with an amplitude (L/√2) which is 1/√2 of the amplitude L at the resonance frequency peak.

$$\text{Internal Friction} = (\omega_2 - \omega_1)/\omega_0 \quad \text{Formula (1)}$$

In the present invention, no particular limitation is placed on the density of the top panel 1, but the smaller the density, the more the consumption energy of the actuators can be reduced. From this viewpoint, the density of the top panel 1 is preferably 4.0 g/cm³ or less and more preferably 3.0 g/cm³ or less.

In this embodiment, the top panel 1 of the tactile sensation display device 10 is a plate made of glass. However, no particular limitation is placed on the material for the top panel 1 so long as it has an internal friction equal to or smaller than the above upper limit. For example, the top panel 1 may be made of a material other than glass, such as resin or ceramics. Among others, the top panel 1 is preferably made of glass because the internal friction of the top panel 1 can be more reduced.

No particular limitation is placed on the type of glass so long as its internal friction is the above upper limit or below, and examples that can be used include alkali-alumino-borosilicic acid glass, alkali-free alumino-borosilicic acid glass, alkali-alumino-borosilicate glass, alkali-alumino-silicate glass, and quartz glass. The glass may be chemically strengthened. By chemically strengthening the glass, the internal friction can be further reduced. The chemical strengthening can be achieved, for example, by immersing the glass into a molten salt to provide ion exchange, thus forming a compressive layer on the surface of the glass.

In the present invention, when asperities are formed on the outside principal surface 1a of the top panel 1, the amount of change in frictional force can be more effectively increased, so that the expressiveness of tactile sensation can be further enhanced. Specifically, the arithmetic mean roughness (Ra) of the outside principal surface 1a of the top panel 1 is preferably 2 nm or more and particularly preferably 5 nm or more. Thus, the amount of change in frictional force can be further increased.

However, if the arithmetic mean roughness (Ra) of the outside principal surface 1a is too large, the amount of change in frictional force tends to decrease. Furthermore, the larger the arithmetic mean roughness (Ra) of the outside principal surface 1a, the larger the haze of the top panel 1 tends to become. If the haze is too large, the image seen through the top panel 1 may blur. Therefore, the arithmetic mean roughness (Ra) of the outside principal surface 1a is preferably not more than 80 nm, more preferably not more than 60 nm, still more preferably not more than 40 nm, particularly preferably not more than 30 nm, and most preferably not more than 20 nm. Thus, the amount of change in frictional force can be further increased and the blurring of the image can be more effectively reduced.

The arithmetic mean roughness (Ra) used herein refers to the arithmetic mean roughness (Ra) defined in JIS B 0601: 2013.

The preferred method for forming asperities on the outside principal surface 1a of the top panel 1 is a wet blasting process. The wet blasting process is performed by uniformly stirring abrasive grains formed of solid particles, such as alumina, and a liquid, such as water, to form a slurry and spraying the slurry onto an original panel (original plate) at high speed. The above spraying can be done using a spraying nozzle. The slurry is sprayed, together with compressed air, through the spraying nozzle at high speed.

In the wet blasting process, when the slurry sprayed at high speed strikes against the original panel, the abrasive grains in the slurry abrade the surface of the original panel, so that asperities are formed on the principal surface of the original panel. Thus, a top panel 1 can be obtained in which asperities are formed on its outside principal surface 1a.

In the present invention, the top panel 1 made of the glass as described above may be subjected to an etching process to modify its surface roughness or thickness. In this case, for example, hydrogen fluoride (HF) gas or hydrofluoric acid can be used for etching.

In the present invention, the haze of the top panel 1 is preferably 10% or less, more preferably 5% or less, and still more preferably 3% or less. If the haze is too large, the image seen through the top panel 1 may blur.

The thickness of the top panel 1 is preferably 0.1 mm to 2 mm and more preferably 0.3 mm to 1.5 mm. If the thickness of the top panel 1 is too small, the mechanical strength is likely to decrease. On the other hand, if the thickness of the top panel 1 is too large, the vibration from the actuators 5 is less likely to be transmitted to the outside principal surface 1a, so that the frictional force between the finger and the outside principal surface 1a may become large.

Although in this embodiment the top panel 1 is transparent, the top panel 1 may not be transparent. For example, a pattern or the like may be formed on the outside principal surface 1a of the top panel 1. In this case, the tactile sensation display device 10 does not necessarily have to include the display 3. In this case, the touch sensor 4 has only to be provided on the surface of the top panel 1 opposite to the outside principal surface 1a. Alternatively, an infrared optical imaging touch sensor may be used. The infrared optical imaging touch sensor is disposed, for example, on a portion of the housing 2 located on the outside of the top panel 1 and detects the location of touch with a person's finger by triangulation.

As shown in FIG. 1, the tactile sensation display device 10 includes a plurality of actuators 5. More specifically, the tactile sensation display device 10 includes an actuator 5 provided in contact with the neighborhood of one end of the top panel 1 and an actuator 5 provided in contact with the neighborhood of the other end of the top panel 1. The plurality of actuators 5 are provided between the top panel 1 and the housing 2. However, the location of the actuators 5 is not limited to the above location and the actuators 5 have only to be provided so that they can apply ultrasonic waves to the top panel 1. It is sufficient to provide at least one actuator 5.

FIG. 3 is a schematic cross-sectional view showing a modification of the tactile sensation display device according to the embodiment of the present invention. As shown in FIG. 3, in the modification, an outer layer film 26 is provided on top of the top panel 21. For the rest, the tactile sensation display device 20 according to this modification has the same structure as the above tactile sensation display device 10.

The outer layer film 26 is, for example, an inorganic film. No particular limitation is placed on the material for the inorganic film and, for example, $SiO_2$ can be used. The outer layer film 26 has a role, for example, in protecting the surface of the top panel 1. Furthermore, asperities may be formed on the surface of the outer layer film 26.

No particular limitation is placed on the method for forming the outer layer film 26 and, for example, the outer layer film 26 can be formed by applying a coating agent containing a silica precursor on the outside principal surface 21a of the top panel 21 by spray coating and then heating the coating agent. The heating temperature is preferably within a range of 80° C. to 250° C. and more preferably within a range of 100° C. to 230° C.

The film formed as the outer layer film 26 may be an antireflection film or a water-repellent or oil-repellent antifouling film for prevention of fouling, such as deposition of fingerprints.

Examples of the antireflection film to be used include a low-refractive index film having a lower refractive index than the top panel 1 and a dielectric multi-layer film in which low-refractive index films having a relatively low refractive index and high-refractive index films having a relatively high refractive index are alternately laid one on top of the other. The antireflection film can be formed by sputtering, CVD (chemical vapor deposition) or other deposition methods.

The antifouling film is preferably a fluorine-containing polymer in which the main chain contains silicon. Examples of the fluorine-containing polymer that can be used include polymers having a —Si—O—Si— unit in their main chain and a fluorine-containing, water-repellent functional group in their side chain. The fluorine-containing polymer can be synthesized, for example, by dehydrocondensation of silanol.

In forming both an antireflection film and an antifouling film, an antireflection film is formed on top of the outside principal surface 1a of the top panel 1 and an antifouling film is then formed on top of the antireflection film.

Also in this modification, since the internal friction of the top panel 21 is not more than the above upper limit, the vibration from the actuators 5 are less likely to be damped in the top panel 21 and can securely be transmitted to the finger. Therefore, also in this tactile sensation display device 20, the expressiveness of tactile sensation can be enhanced.

The effects of the present invention will be described below in detail by taking specific examples of the present invention. However, the present invention is not limited by the following examples.

Examples 1 to 12 and Comparative Example 1

Respective glass plates having the compositions shown by Examples 1 to 12 in Table 1 were prepared and used as top panels. In Example 4, chemically strengthened glass was used as a top panel. In Comparative Example 1, acrylic resin was used as a top panel.

The internal friction and Young's modulus of each top panel in Examples 1 to 12 and Comparative Example 1 were measured in conformity with dynamic elastometry (the flexural resonance method) defined in JIS R 1602, using JE-RT3 manufactured by Nihon Techno-Plus Corporation.

Specifically, the internal friction was obtained using the following Formula (1) where $\omega_0$ represents a frequency at a resonance frequency peak and $\omega_1$ and $\omega_2$ represent frequencies with an amplitude ($L/\sqrt{2}$) which is $1/\sqrt{2}$ of the amplitude L at the resonance frequency peak.

$$\text{Internal Friction} = (\omega_2 - \omega_1)/\omega_0 \quad \text{Formula (1)}$$

Furthermore, the density of each glass in Examples 1 to 12 was measured by the Archimedes' method. The density of the acrylic resin in Comparative Example 1 was measured by the water displacement method.

(Sensory Evaluation of Slipperiness)

Actuators were placed on both the short-side ends of each top panel with a size of 150 mm×78 mm×1 mm in Examples 1 to 12 and Comparative Example 1. Ultrasonic waves were applied to the top panel by the actuators to vibrate the top panel at a natural frequency in an ultrasonic frequency band. A sensory evaluation of slipperiness was made by sliding a finger on the outside principal surface in the above conditions. The sensory evaluation of slipperiness was made based on the following evaluation criterion. Larger evaluation values indicate greater slipperiness.

<Evaluation Criterion>
5: Extremely slippery
4: Very slippery
3: Slippery
2: Somewhat slippery
1: Not sure The results are shown in Table 1 below.

addition, the slipperiness in Example 12 during application of ultrasonic waves is the evaluation value 3, while the slipperiness in Examples 1 to 11 during application of ultrasonic waves is the evaluation value 4 or more greater than the evaluation value 3. Therefore, it can be seen that, in Examples 1 to 11 of the present invention, the internal frictions of the top panels are less than $5.0 \times 10^{-3}$ smaller than in Example 12 and the expressiveness of tactile sensation can be further enhanced.

TABLE 1

| Specimen | | EX. 1 | EX. 2 | EX. 3 | EX. 4 | EX. 5 | EX. 6 | EX. 7 |
|---|---|---|---|---|---|---|---|---|
| mol % | $SiO_2$ | 66 | 63 | 68 | 68 | 70 | 66 | 72 |
| | $Al_2O_3$ | 13 | 8 | 11 | 11 | 9 | 13 | 4 |
| | $B_2O_3$ | 6 | 2 | | | 2 | | 9 |
| | $Li_2O$ | | | | | | | |
| | $Na_2O$ | | 16 | 15 | 15 | 14 | 17 | 11 |
| | $K_2O$ | | 3 | 1 | 1 | | | |
| | MgO | 4 | 3 | 5 | 5 | 5 | 4 | |
| | CaO | 8 | 3 | | | | | 3 |
| | SrO | | | | | | | |
| | BaO | 3 | | | | | | |
| | ZnO | | | | | | | 1 |
| | $P_2O_5$ | | | | | | | |
| | $TiO_2$ | | | | | | | |
| | $ZrO_2$ | | 2 | | | | | |
| Material | | | | | glass | | | |
| Chemical Strengthening | | no | no | no | yes | no | no | no |
| Internal Friction | | $7.29 \times 10^{-4}$ | $1.32 \times 10^{-3}$ | $2.79 \times 10^{-3}$ | $1.90 \times 10^{-3}$ | $3.01 \times 10^{-3}$ | $4.47 \times 10^{-3}$ | $1.50 \times 10^{-3}$ |
| Young's Modulus[Gpa] | | 78 | 75 | 70 | 71 | 70 | 71 | 76 |
| Density[g/cm³] | | 2.52 | 2.54 | 2.45 | 2.45 | 2.42 | 2.45 | 2.44 |
| Slipperiness | | 5 | 4 | 4 | 4 | 4 | 4 | 4 |

| Specimen | | EX. 8 | EX. 9 | EX. 10 | EX. 11 | EX. 12 | COMP. EX. 1 |
|---|---|---|---|---|---|---|---|
| mol % | $SiO_2$ | 66 | 72 | 100 | 64 | 68 | |
| | $Al_2O_3$ | 5 | 14 | | 6 | 13 | |
| | $B_2O_3$ | | | | 23 | 3 | |
| | $Li_2O$ | | 8 | | | | |
| | $Na_2O$ | 5 | | | | 14 | |
| | $K_2O$ | 5 | | | | | |
| | MgO | 3 | 1 | | 2 | 2 | |
| | CaO | 3 | | | 5 | | |
| | SrO | 6 | | | | | |
| | BaO | 4 | 1 | | | | |
| | ZnO | | | | | | |
| | $P_2O_5$ | | 1 | | | | |
| | $TiO_2$ | | 2 | | | | |
| | $ZrO_2$ | 3 | 1 | | | | |
| Material | | | | glass | | | acrylic resin |
| Chemical Strengthening | | no | no | no | no | no | no |
| Internal Friction | | $8.31 \times 10^{-4}$ | $3.15 \times 10^{-3}$ | $1.63 \times 10^{-3}$ | $7.72 \times 10^{-4}$ | $5.43 \times 10^{-3}$ | $3.32 \times 10^{-2}$ |
| Young's Modulus[Gpa] | | 77 | 85 | 73 | 54 | 67 | 3.1 |
| Density[g/cm³] | | 2.82 | 2.44 | 2.20 | 2.22 | 2.40 | 1.19 |
| Slipperiness | | 5 | 4 | 4 | 5 | 3 | 1 |

As shown in Table 1, the internal frictions of the top panels in Examples 1 to 12 are less than $1.0 \times 10^{-2}$. In contrast, the internal friction in Comparative Example 1 is more than $1.0 \times 10^{-2}$. In addition, the slipperiness in Comparative Example 1 during application of ultrasonic waves is as small as the evaluation value 1, whereas the slipperiness in Examples 1 to 12 during application of ultrasonic waves is as large as the evaluation value 3 or more. Therefore, it can be seen that, in Examples 1 to 12 of the present invention, the internal frictions of the top panels are as small as less than $1.0 \times 10^{-2}$ and the expressiveness of tactile sensation can be enhanced.

Furthermore, the internal frictions of the top panels in Examples 1 to 11 are less than $5.0 \times 10^{-3}$. Unlike this, the internal friction in Example 12 is more than $5.0 \times 10^{-3}$. In

REFERENCE SIGNS LIST 1, 21 . . . top panel
1a, 21a . . . outside principal surface
2 . . . housing
2a . . . opening
3 . . . display
4 . . . touch sensor
5 . . . actuator
10, 20 . . . tactile sensation display device
26 . . . outer layer film

The invention claimed is:
1. A top panel for a tactile sensation display device, the top panel being for use in a tactile sensation display device and having an internal friction of $1.0 \times 10^{-2}$ or less.

2. The top panel for a tactile sensation display device according to claim 1, the top panel having an internal friction of $5.0 \times 10^{-3}$ or less.

3. The top panel for a tactile sensation display device according to claim 1, the top panel being made of glass.

4. The top panel for a tactile sensation display device according to claim 1, the top panel being transparent.

5. A tactile sensation display device comprising:
the top panel for a tactile sensation display device according to claim 1; and
an actuator that applies ultrasonic waves to the top panel for a tactile sensation display device.

* * * * *